June 27, 1933.   R. J. MEYER   1,915,687
MINING CARTRIDGE
Filed July 13, 1931
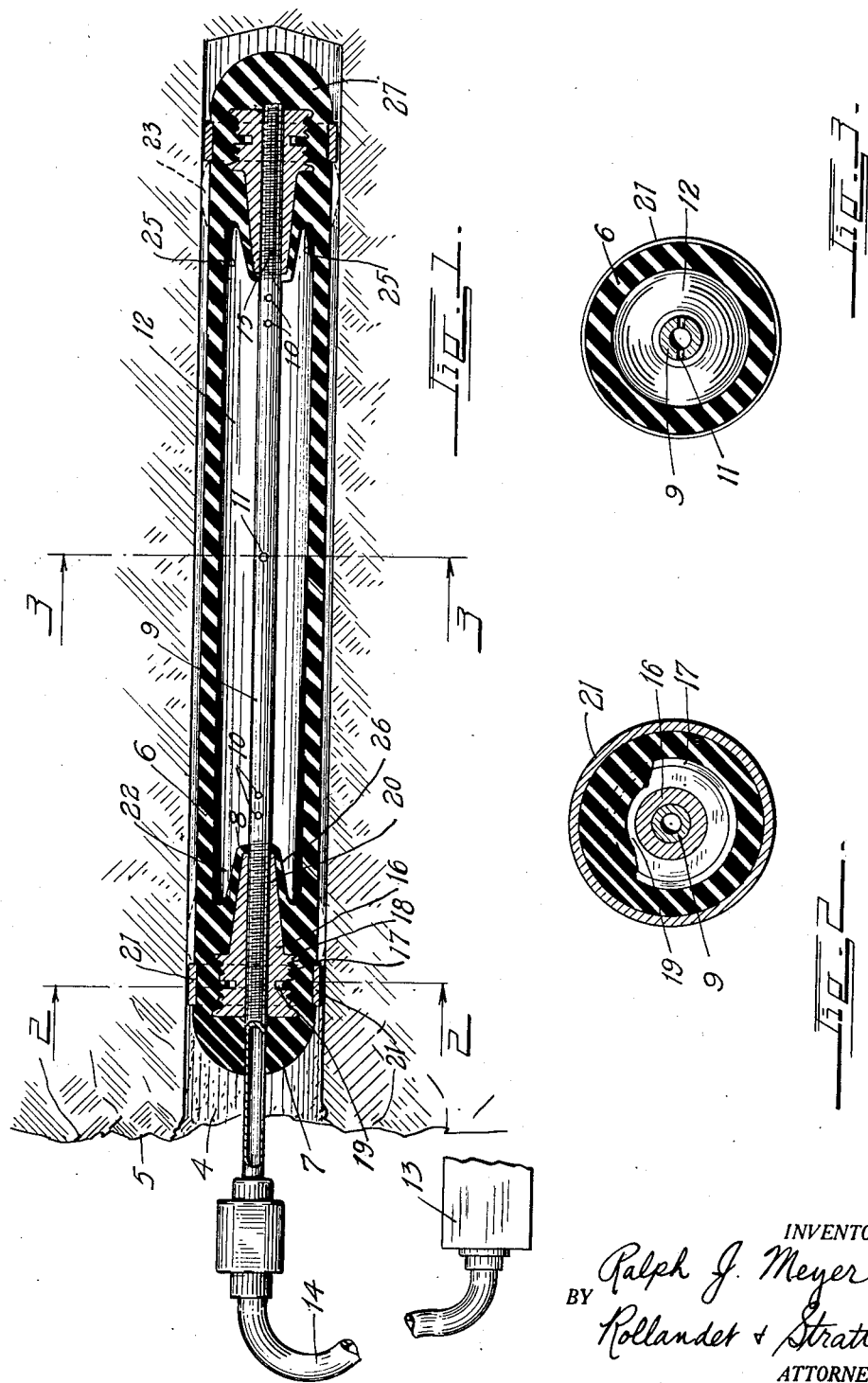
INVENTOR.
Ralph J. Meyer
BY Rollandet & Stratton
ATTORNEYS Patented June 27, 1933

1,915,687

UNITED STATES PATENT OFFICE

RALPH J. MEYER, OF DENVER, COLORADO

MINING CARTRIDGE

Application filed July 13, 1931. Serial No. 550,375.

My invention relates to means and method for breaking coal, and particularly to expansible tubes adapted for breaking coal, rock and other earthen structures.

An important object of the invention is to eliminate the necessity of tamping, in order to secure the tube in place in a bore.

Another object is to provide means in such a tube whereby it will not be destroyed at each operation, but may be used repeatedly.

A further object is to provide novel and practical means for preventing the escape of pressure fluid from the interior of the tube.

Still another object is to provide means to equalize the introduction of fluid pressure throughout the length of the tube.

Other objects reside in details of construction and in novel methods of using the present invention and in novel construction, combination and arrangement of parts.

In the drawing, like reference characters designate similar parts in the several views.

Figure 1 is a longitudinal section through a device embodying the foregoing objects, showing it in an operative position.

Figures 2 and 3 are respectively enlarged sections taken on the lines 2—2 and 3—3 of Figure 1.

Referring more in detail to the drawing, the reference character 4 designates a drilled bore or recess in coal or other formation 5.

An elastic tube 6 has been inserted longitudinally in the bore. The tube comprises heavy buttressed ends 7 that have inwardly projecting lips 8. Mounted axially of the tube is a hollow pipe or rod 9 that contains restricted apertures 10 adjacent the lips 8 and at the ends of the hollow tube 6. Central apertures 11 are of larger diameter than the apertures 10. The purpose of the variation in size of the apertures is to equalize the introduction of pressure fluid from the pipe 9 into the space 12. By having restricted outlets at the ends of the tube, the greater portion of fluid escapes from the center opening 11.

A high pressure pump 13 of any suitable form is connected with the pipe 9 by a flexible conduit 14. Since the pump per se forms no part of the present invention, further illustration appears unnecessary.

The pipe 9 is threaded near the ends of the tube 6, as shown at 15. These threaded ends carry spool-like, anchoring and clamp cooperating members 16 that have ribbed portions 17 between flanges 18. A circumferential groove 19 is formed on the body part of the spool, for a purpose hereinafter to be described.

The spool members 16 have integral, laterally projecting, tapering sleeve members 20. The internal lips 8 of the tube are cured on the sleeve member and cover the threaded connection between the sleeves and the pipe 9.

A ring 21 is compressed on the tube opposite the ribbed body portion of the spool, which clamps the rubber therebetween. By reason of the great pressure exerted by the ring, a certain amount of rubber is forced into the circumferential groove 19, as shown at 22 in Figure 2, against an air cushion therein. The rubber is also forced into the grooves between the ribs 17 to hold the tube, spool and connected parts in their relative positions.

The inner surface of the tube is tapered toward the buttressed ends from the midpoint of the tube. The tube is only tapered a short distance toward the inner end 27, as shown at 25, but is tapered a longer distance toward the outer end, preferably about half the length of the tube, as shown at 26. This arrangement has the distinct advantage of throwing the pressure towards the inner end 27 of the tube, since more pressure is necessary to dilate the outer end of the tube. "Inner" and "outer" ends in this specification refer to the position of the tube when placed in the bore, the "outer" end being the feed end for the pressure fluid, the "inner" end being the closed, opposite end farthest in the bore.

By having the greater pressure at the inner end of the tube, the entire under-cut wall of coal is broken, instead of just the shoulders around the entrance to the bore. In practice, the coal is under cut below the bore. Since undercutting is known in the art for non-analogous uses, further description and illustration of same appear unnecessary. The break in the coal occurs between the bore and the undercut.

In the use of the invention, pressure fluid is supplied by the pump to the tube through the conduit 14. The pressure fluid is preferably a liquid, as water, oil, or the like, and not a gas. The objection to a gas is that if such were used, the tube would blow out with a single use, due to the expansive properties of gas. On the other hand, a liquid is not compressible or expansible, so that the moment a break is made in the formation, pressure on the tube is relieved and it will not burst, but may be used repeatedly. Gas may, however, be used for certain types of work.

As stated, by making the central apertures larger, the pressure fluid is evenly introduced into the tube and pressure is not built up any more at one end than at the other. The tube and pipe 9 are preferably filled with liquid before being inserted into the bore 4. The filled tube is then stood on end to allow the liquid therein to displace all of the air in same.

Then the tube is inserted in the bore and the pump is operated to introduce more liquid into the tube, to expand same. As the pressure increases within the tube, the lips 8 are compressed against the sleeve members 20 and the ends of the lips against the pipe 9. This compression is due to the inwardly projecting arrangement of the lips, for pressure in spaces 22 around the lips 8 causes the rubber to move inwardly and outwardly therefrom.

The outward movement of the rubber tube causes annular bosses 23 to form inside the steel rings 21. These bosses make the tube conform to the face of the bore and provide a tight fit for the tube therein. This tight fit eliminates the necessity of tamping around the tube, for the tube fits in the bore tightly without any external means.

The pipe 9, among other things, acts as a strengthening member and prevents longitudinal expansion of the tube.

The present invention has been worked out by experimentation, and an embodiment of the present invention has broken tons of the hardest coal in the Colorado coal fields, in its natural formation.

It is to be understood that changes may be made in the construction and arrangement of parts without departing from the spirit and scope of the invention.

What I claim and desire to secure by Letters Patent is:

1. In apparatus for breaking material of the character described, a hollow, elastic tube having heavy, buttressed heads, clamping members embedded in the heads and tapering toward each other, lips integral with the tube extending along the tapering surfaces of said members, the tube having a compression space around said lips and within the tube, and clamping rings around the tube cooperating with the clamping members.

2. In apparatus for breaking material of the character described, a hollow, elastic tube having heavy, buttressed heads, an externally threaded rod longitudinal of the tube, clamping members engaging threads of the rod and embedded in the heads of the tube, lips integral with the tube covering said members, the tube having a compression space around said lips and within the tube, and clamping rings around the tube cooperating with the clamping members.

3. In apparatus for breaking material of the character described, a hollow, elastic tube having heavy, buttressed heads, a pipe extending longitudinal of the tube, clamping members mounted on the pipe and embedded in the heads of the tube, lips integral with the tube covering said members, the tube having a compression space around said lips and within the tube, means to supply pressure fluid to said space through the pipe, and clamping rings around the tube cooperating with the clamping members.

4. An elastic, hollow tube for breaking coal and the like, having relatively heavy, buttressed ends, an apertured pipe extending from end to end interiorly of the tube and having threaded portions in the ends, and threaded anchoring means embedded in the heads and screwed on the threaded portions of the pipe.

5. An elastic, hollow tube for breaking coal and the like, having relatively heavy, buttressed ends, and a stiffening member connecting the ends interiorly of the tube, the tube having integral tapering lips extending inwardly from the ends along said members, and the tube having a compression space around said lips and within the tube.

6. An elastic, hollow tube for breaking coal and the like, having relatively heavy, buttressed, elastic ends, anchoring means embedded in said ends, clamping rings around the periphery of the tube disposed opposite said members, to clamp portions of the tube therebetween, and a stiffening member connected with said means interiorly of the tube and holding the ends together.

7. An elastic, hollow tube for breaking coal and the like, having relatively heavy, buttressed, elastic ends, anchoring means consisting of spool-like members provided with flanges at their ends and having ribs between the flanges, the members being embedded in said ends, clamping rings around the periphery of the tube disposed opposite the ribbed portion of the members and between the flanges, and a stiffening element connected with said members interiorly of the tube and holding the ends together.

8. An elastic, hollow tube for breaking coal and the like, having relatively heavy, buttressed, elastic ends, anchoring means embedded in said ends, said means being recessed to provide air spaces, the elastic ends closing the recesses and trapping air therein to provide air cushions, clamping rings around the periphery of the tube disposed to force material of said ends against the air cushions, and a stiffening member connected with said means interiorly of the tube and holding the ends together.

In testimony whereof I hereunto affix my signature.

RALPH J. MEYER.